(12) United States Patent
Cao (10) Patent No.: US 7,450,606 B2
(45) Date of Patent: *Nov. 11, 2008

(54) BIT SLICE ARBITER

(75) Inventor: Jun Cao, San Leandro, CA (US)

(73) Assignee: Broadcom Corporation, Irvine, CA (US)

( * ) Notice: Subject to any disclaimer, the term of this patent is extended or adjusted under 35 U.S.C. 154(b) by 1020 days.

This patent is subject to a terminal disclaimer.

(21) Appl. No.: 10/759,454

(22) Filed: Jan. 20, 2004

(65) Prior Publication Data

US 2004/0156323 A1    Aug. 12, 2004

Related U.S. Application Data

(63) Continuation of application No. 09/241,658, filed on Feb. 2, 1999, now Pat. No. 6,700,899.

(60) Provisional application No. 60/073,861, filed on Feb. 3, 1998.

(51) Int. Cl.
*H04L 12/42* (2006.01)
(52) U.S. Cl. ....................... 370/450; 370/461
(58) Field of Classification Search ........... 370/450, 370/461, 218, 352, 353, 354, 452, 356, 359, 370/360, 367, 386, 518, 909, 910, 364, 395.4, 370/395.42, 403, 482, 496, 535, 413, 428, 370/429, 470, 471, 473, 460

See application file for complete search history.

(56) References Cited

U.S. PATENT DOCUMENTS

| 4,726,018 A | 2/1988 | Bux et al. |
| 5,132,965 A | 7/1992 | Zhang |
| 5,216,668 A | 6/1993 | Zhang |
| 5,301,333 A | 4/1994 | Lee |
| 5,473,604 A | 12/1995 | Lorenz et al. |
| 5,566,177 A | 10/1996 | Bhandari et al. |
| 5,640,519 A | 6/1997 | Langendorf et al. |
| 5,872,936 A | 2/1999 | Eckstein |

(Continued)

*Primary Examiner*—Chi H Pham
*Assistant Examiner*—Alexander Boakye
(74) *Attorney, Agent, or Firm*—Squire, Sanders & Dempsey L.L.P.

(57) ABSTRACT

An arbiter circuit is provided for resolving a plurality of N request signals received from a plurality of agents requesting access to a resource. The arbiter circuit includes: a token distribution circuit responsive to a first clock signal defining a grant cycle, and providing a plurality of token priority signals each corresponding with one of the agents, the distribution circuit being operative to prioritize one of the agents at the beginning of each grant cycle by asserting the token priority signal corresponding with the prioritized agent; means forming a token ring; and a plurality of N grant devices coupled together by the token ring, each of the grant devices corresponding with an associated one of the agents and being responsive to the corresponding request signal provided by the associated agent, and also being responsive to the token priority signal corresponding with the associated agent, and being further responsive to a corresponding token carry signal, each of the devices being operative to provide a grant signal to its associated agent if the corresponding request signal is asserted and either the corresponding token priority signal or the corresponding token carry signal is asserted. The token ring means may include a token look ahead device providing enhanced performance characteristics. The token look ahead device is operative to generate the token carry signals in a predictive manner to eliminate a ripple effect.

19 Claims, 8 Drawing Sheets

U.S. PATENT DOCUMENTS

| | | | |
|---|---|---|---|
| 5,890,001 A | 3/1999 | Hall | |
| 5,910,954 A | 6/1999 | Bronstein et al. | |
| 6,076,132 A | 6/2000 | Chen | |
| 6,246,692 B1 | 6/2001 | Dai et al. | |
| 6,269,418 B1 | 7/2001 | Nakamura | |
| 6,700,899 B1 * | 3/2004 | Cao | 370/450 |

* cited by examiner

BIT SLICE ARBITER

CROSS REFERENCE TO RELATED APPLICATIONS

This application claims priority from U.S. provisional application Ser. No. 60/073,861, filed Feb. 3, 1998, the contents of which are hereby incorporated by reference. This application is a continuation of U.S. Ser. No. 09/241,658, filed Feb. 2, 1999, issued as U.S. Pat. No. 6,700,899.

BACKGROUND OF THE INVENTION

1. Field of the Invention

The present invention relates generally to a method and apparatus for resource arbitration in electronic systems. More specifically, the present invention relates to a scaleable arbiter circuit providing high performance characteristics for use in electronic systems.

2. Description of the Prior Art

In many different types of electronic systems, multiple agents including hardware units and software modules compete for access to a single resource such as an interconnect bus or memory unit. For example, in computer systems, multiple agents may simultaneously request access to a memory device. As another example, in network switches, multiple agents may simultaneously request access to a routing resource such as a packet routing address look up table or a network output port. In such systems, agents generally issue resource requests to gain exclusive access to the resource for a period of time. Such systems require means for arbitrating between the requests in order to determine which agent gains control of the resource when two or more agents are simultaneously competing for control of the resource.

Typically, electronic systems include an arbitration system for arbitrating between requests received from the multiple requesting agents, and for granting access to a selected one of the requesting agents. After one of the requesting agents gains access to the resource, it performs a particular operation and relinquishes access to the resource upon completion of the particular operation or expiration of the predetermined time period, whichever occurs first.

There are a number common types of arbitration schemes used for implementing arbitration systems. In accordance with one types of arbitration scheme, called "fixed priority arbitration", resource access is granted to a requesting agent having a highest priority. Thus, the highest priority agent is guaranteed to experience very low latency. However, the fixed priority arbitration scheme "starves" requesting agents assigned with a low priority when an agent assigned with the highest priority is frequently requesting access to the resource.

Another type of arbitration scheme, referred to as round robin arbitration, is slightly more complex to implement than fixed priority arbitration. However, round robin arbitration provides the advantage of uniform resource allocation. As a result, the latency imposed on the requesting agents is generally uniform since each requesting agent is provided access to the resource before another agent regains access to the resource.

In many types of electronic systems, an arbitration system must be able to quickly respond to and resolve a large number of agents competing for access to a single resource. One example of a system requiring a high performance arbiter circuit is a network switch. As the number of competing agents increases, the performance of a typical prior art arbitration system decreases, and latencies are incurred. It often becomes necessary for arbiters employing typical prior art arbitration schemes to arbitrate in multiple cycles.

What is needed is an arbiter circuit which provides enhanced performance characteristics, and therefore minimal arbitration latency.

What is also needed is an arbiter circuit wherein the number of requests which may be resolved by the circuit is easily scaleable without incurring much cost.

SUMMARY OF THE INVENTION

It is an object of the present invention to provide a high performance arbiter circuit for use in electronic systems, the arbiter circuit providing a high operating frequency, and therefore minimal arbitration latency.

It is another object of the present invention to provide an arbiter circuit wherein the number of requests which may be resolved by the circuit is easily scaleable without incurring much cost.

Briefly, a presently preferred embodiment of the present invention includes an arbiter circuit for resolving a plurality of N request signals received from a plurality of agents requesting access to a resource. The arbiter circuit includes: a token distribution circuit responsive to a first clock signal defining a grant cycle, and providing a plurality of token priority signals each corresponding with one of the agents, the distribution circuit being operative to prioritize one of the agents at the beginning of each the grant cycle by asserting the token priority signal corresponding with the prioritized agent; means forming a token ring; and a plurality of N grant devices coupled together by the token ring, each of the grant devices corresponding with an associated one of the agents and being responsive to the corresponding request signal provided by the associated agent, and also being responsive to the token priority signal corresponding with the associated agent, and being further responsive to a corresponding token carry signal, each of the devices being operative to provide a grant signal to its associated agent if the corresponding request signal is asserted and either the corresponding token priority signal or the corresponding token carry signal is asserted.

In one embodiment, the token carry signal received by a particular one of the devices is provided by an adjacent one of the devices via the token ring means, and wherein the token carry signal received by the particular device is asserted by the adjacent device if the request signal received by the adjacent device is not asserted and either of the token priority signal or the token carry signal corresponding with the adjacent device is asserted.

In another embodiment, the token ring means includes a token look ahead device providing enhanced performance characteristics. In this embodiment, each of the grant devices is operative to generate a corresponding token propagate signal in response to the corresponding request signal, and is also operative to generate a corresponding token generate signal in response to the corresponding token priority signal and the corresponding request signal. The token look ahead device is operative to generate the token carry signals in a predictive manner in response to the token propagate signals and the token generate signals.

An important advantage of an arbiter circuit according to the present invention is that the maximum number of requests which may be resolved by the circuit is easily scaleable.

Another advantage of an arbiter circuit according to the present invention is that the operational speed may be enhanced by employing a look ahead carry circuit to arbitrate large numbers of requests in a minimum number of arbitration cycles.

The foregoing and other objects, features, and advantages of the present invention will be apparent from the following detailed description of the preferred embodiment which makes reference to the several figures of the drawing.

DETAILED DESCRIPTION OF THE PREFERRED EMBODIMENTS

The present invention overcomes the problems associated with the prior art by providing a method and apparatus for resource arbitration in electronic systems. Specifically, the present invention describes a cost effective and scaleable resource arbitration system which may be configured to perform at higher speeds. In the following description, numerous specific details are set forth (e.g., specific circuit configurations) in order to provide a thorough understanding of the invention. Those skilled in the art will recognize, however, that the invention may be practiced apart from these specific details. In other instances, well known details of circuits (e.g., a schematic diagram of a carry look ahead circuit) have been omitted, so as not to unnecessarily obscure the present invention.

A scaleable resource arbitration system in accordance with the present invention may be used in any type of electronic system in which a plurality of agents, including hardware and software devices or sub-systems, share a resource. For example, a resource arbitration system in accordance with the present invention may be used in a network switch having any type of configuration (e.g., a bus topology or ring topology). As another example, a resource arbitration system in accordance with the present invention may be used in a computer system having a memory shared by multiple competing resources including graphics processing systems.

Figure 1:
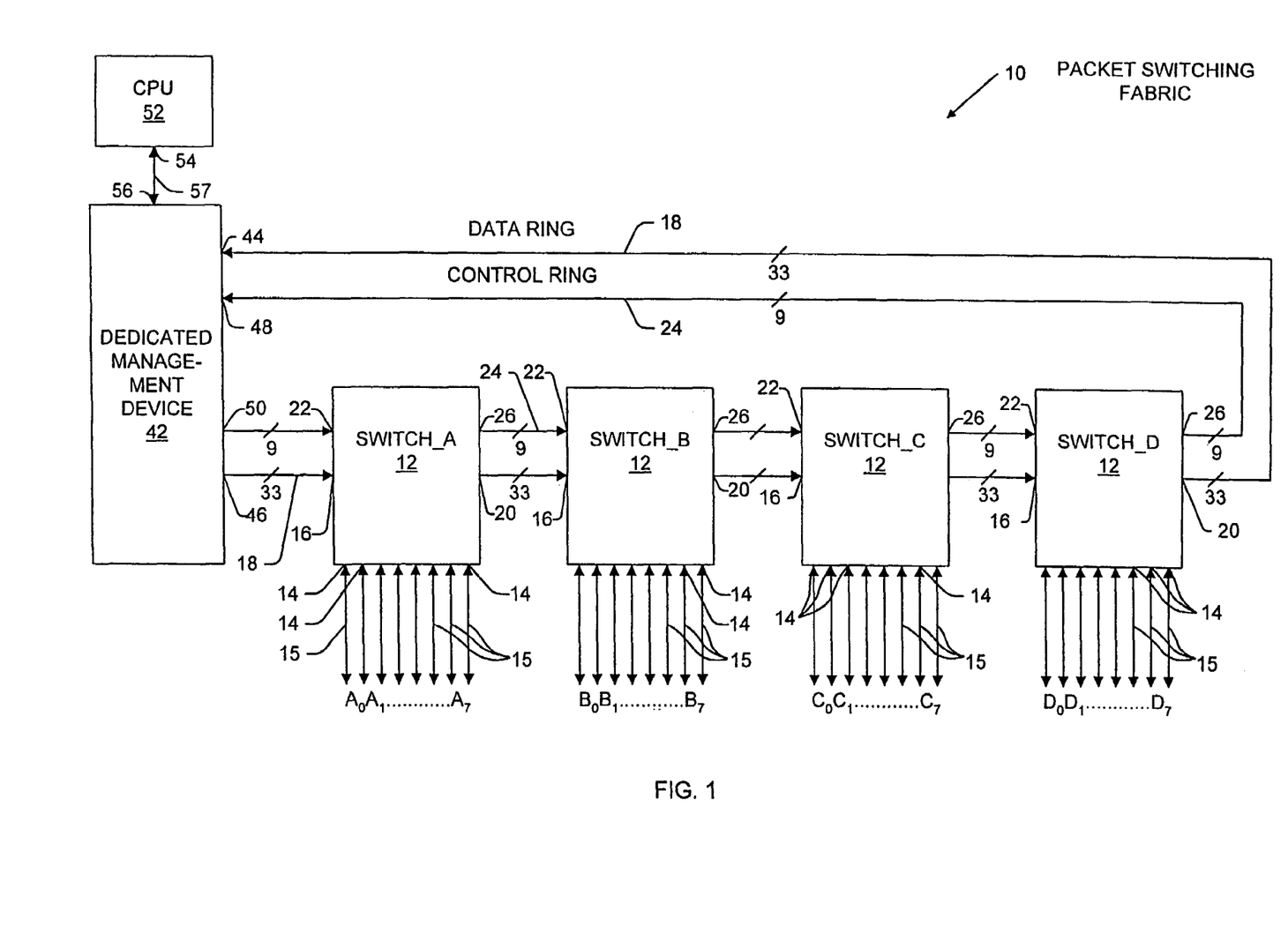
FIG. 1 is a schematic block diagram of a packet switching fabric including a plurality of switching devices each employing an arbitration procedure in accordance with the present invention.

FIG. 1 shows a schematic block diagram at 10 of a packet switching fabric including means for resource arbitration (not shown) according to the present invention as further explained below. The switching fabric 10 includes four switching devices 12, designated SWITCH_A, SWITCH_B, SWITCH_C, and SWITCH_D, each having: eight network ports 14 designated $(A_0, A_1, \ldots, A_7)$, $(B_0, B_1, \ldots, B_7)$, $(C_0, C_1, \ldots, C_7)$ and $(D_0, D_1, \ldots, D_7)$ respectively for transmitting and receiving data packets via corresponding ETHERNET links 15; a data ring input port 16 connected to receive data and data ring messages from an upstream device via a corresponding one of a plurality of 33-bit data ring segments 18; a data ring output port 20 connected to transmit data and data ring messages to a corresponding downstream device via a corresponding one of the data ring segments 18; a control ring input port 22 connected to receive control ring messages which include resource reservation protocol messages from the corresponding upstream device via a corresponding one of a plurality of control ring segments 24; and a control ring output port 26 connected to transmit control ring messages to the corresponding downstream device via a corresponding one of the control ring segments 24.

The packet switching fabric 10 also includes: a dedicated ring management device 42 having a data ring input port 44 connected to receive data and data ring messages from the corresponding upstream device, SWITCH_D, via a corresponding one of the data ring segments 18, a data ring output port 46 connected to transmit data and data ring messages to the corresponding downstream device, SWITCH_A, via a corresponding one of the data ring segments, a control ring input port 48 connected to receive control ring messages from the upstream device via a corresponding one of the control ring segments 24, and a control ring output port 46 for transmitting control ring messages to the downstream device via a corresponding one of the control ring segments; and a central processing unit 52 having a port 54 connected to a port 56 of the management device 42 via a CPU link 57.

Details of the depicted switching fabric are described in Applicants' pending U.S. patent application Ser. No. 09/092,350, filed Jun. 5, 1998, entitled "Packet Switching Fabric Using A Segmented Ring With Resource Reservation Protocol", is incorporated herein by reference in its entirety. U.S. patent application Ser. No. 09/092,350 claims the benefit of Applicants' earlier filed U.S. Provisional Application Ser. No. 60/073,535, filed Feb. 3, 1808, entitled "Packet Switching Fabric Using the Segmented Ring With Resource Reservation Control."

As further explained below, each of the switching devices 12 includes an arbitration system in accordance with the present invention which is responsive to resource requests including source request messages received from other ones of the switching devices 12 via the corresponding control ring input port 22, and local source request signals received from local ones of the corresponding network ports 14. Each of the switching devices 12 includes arbitration means operative to resolve simultaneous source requests, and to grant access to shared packet routing resources of the switching fabric 10 as further explained below.

Figure 2:
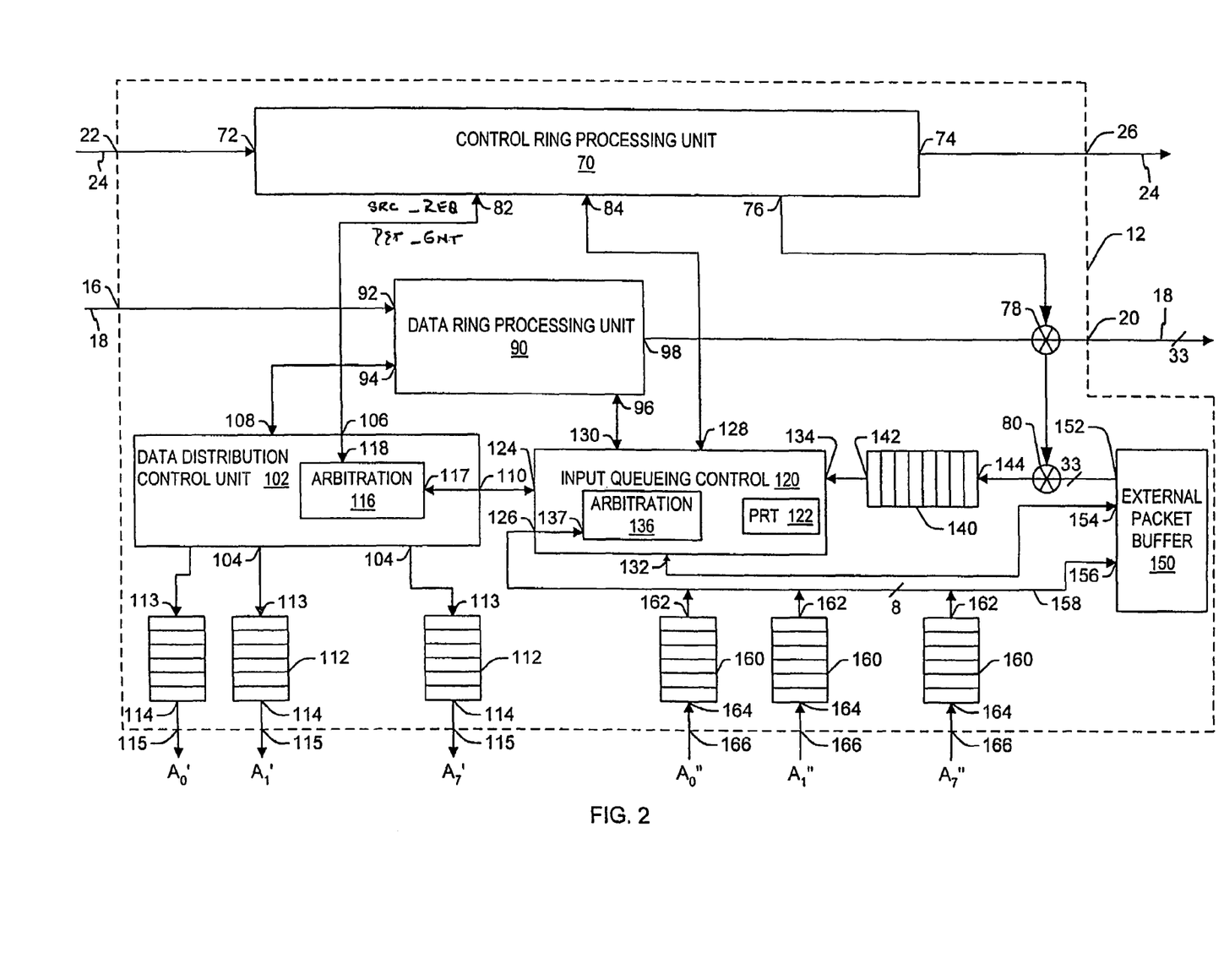
FIG. 2 is a detailed schematic circuit block diagram of a switching device of the packet switching fabric of FIG. 1, the switching device including a pair of arbitration subsystems in accordance with the present invention.

FIG. 2 shows a detailed schematic circuit block diagram of components of one of the switching devices 12 of the packet switching fabric of 10 (FIG. 1). Each of the switching devices includes a data ring processing sub-system, a network interface sub-system, and a control ring sub-system.

The control ring sub-system of the switching device 12 includes a control ring processing unit 70 having: an input port 72 connected to receive control ring messages including resource reservation protocol messages via control ring input port 22; an output port 74 connected to provide the control ring messages to the control ring via the control ring output port 26; a bandwidth control port 76 connected to provide channel bandwidth resource control signals to a data ring channel bandwidth resource means 78, and a packet buffer channel bandwidth resource means 80 further explained below; a port 82; and a port 84.

The data ring processing sub-system of the switching device 12 includes a data ring processing unit 90 having: an input 92 connected to receive packet data bursts from a corresponding upstream switching device 12 (FIG. 1) via a corresponding data segment 18 and the data ring input port 16; a data port 94 further explained below; a port 96 further explained below; and an output 98 connected to the data ring output port 20 via the data ring channel bandwidth resource means 78 which is responsive to the channel bandwidth resource control signals.

The depicted switching device 12 further includes: a data distribution control unit 102 having eight outputs 104, a port 106, coupled for communication with port 82 or the control ring processing unit 70 an input 108 connected to receive packet data bursts from output 94 of the data ring processing unit 90, and a port 110 further explained below; and eight transmit buffer queues 112 each having an input 113 connected to receive data from a corresponding one of the eight outputs 104 of unit 102, and an output 114 connected to a corresponding one of eight network output ports 115 designated ($A_0'$, $A_1'$, ..., $A_7'$).

The data distribution control unit 102 includes a network output port arbitration sub-system 116 having a first port 117 coupled with port 110 for communicating with local requesting agents competing for access to the eight network output ports 115 for the purpose of transmitting data packets to the network as further explained below; and a second port 118 coupled with port 82 of the control ring processing unit 70 via port 106 for the purpose of communicating with non-local requesting agents also competing for access to the eight network output ports as further explained below.

The control ring processing sub-system of the depicted switching device 12 further includes an input queuing control unit 120 having a packet routing table (PRT) 122 providing packet routing information as further described below, an output 124 connected to provide data to the input 110 of the data distribution control unit 102, as further explained below, a bus port 126, a control port 128 connected to receive queuing enable signals from port 84 of the control ring processing unit 70, a port 130 connected to port 96 of the data ring processing unit 90, a packet buffer memory control port 132, and a data input port 134. The control unit 120 also includes a packet routing table arbitration sub-system 136 having a port 137 coupled with port 126 for communicating with requesting agents competing for access to the packet routing table 122 as further explained below.

A network interface sub-system of the depicted switching device 12 includes an internal first in-first out buffer (FIFO) 140 having an output 142 connected to provide data to input 134 of the control unit 120, and an input 144; an. external packet buffer 150 having a data output 152 connected to input 144 of FIFO 140 via the packet buffer channel bandwidth resource means 80 which is responsive to the channel bandwidth resource control signals provided by the control ring processing unit 70 to control the bandwidth resources of the 32 bit wide communication path between output 152 of packet buffer 150 and input 144 of the FIFO 140, a control port 154 connected to receive queuing control signals from the packet buffer memory control port 132 of the control unit 120 and also providing data address pointer information to control port 132 of the input queuing control unit, and an input 156 connected to a bus 158 which is connected to bus port 126 of the control unit 120; and eight receive buffer queues 160 each having an output 162 connected to provide data to the bus 158, and an input 164 connected to receive data from a corresponding one of eight network input ports 166 designated ($A_0''$, $A_1''$, ..., $A_7''$). The eight network input ports 166, and corresponding eight network output ports 115 designated ($A_0'$, $A_1'$, ..., $A_7'$) are implemented by the eight network bi-directional ports 14 designated ($A_0$, $A_1$, ..., $A_7$) (FIG. 1).

An ETHERNET frame, or packet of data, includes header information specifying a source address of a source end node, and a destination address of a destination end node. When a data packet is received via one of the network input ports 166, the data packet is initially buffered by the corresponding receive buffer queue 160. The control unit 120, which is connected to bus 158 via its input 126, receives header information of the packet including its ETHERNET destination address. Concurrently, the packet is transmitted to and stored in buffer 150. Upon storing the data packet, buffer 150 provides pointer addresses to port 132 of the control unit 120 which includes queuing structure storage registers for storing pointer addresses corresponding to each received data packet.

If two or more data packets are simultaneously received at the receive buffer queues 160, the corresponding receive buffer queues generate request signals which are provided to port 137 of the packet routing table arbitration sub-system 136 via port 126 of the control unit 120. The arbitration sub-system 136 is operative to resolve requests for access to the packet routing table 122 on behalf of the simultaneously received data packets, and to provide grant signals to the receive buffer queues 160 to grant access to selected ones of the packet routing table 122 as further described below.

After the arbitration sub-system 136 grants access to the packet routing table for a data packet, the control unit 120 reads the destination address included in the header information of the data packet received via the network ports to determine a destination port of the packet via the packet routing table 122 which provides ID codes of the destination device and output port which is communicatively coupled to the destination end node specified by the destination address. The packet routing table 122 indicates to which network output port 115 of which device a particular packet must be forwarded to reach the end node indicated by the destination address specified by the packets header. The control unit 120 reads the header information of the data packet including the source address and destination address, and performs a packet destination look up operation using the destination address.

When a match is found in the packet routing table 122 for a destination address specified by packet header information, it is then determined whether the destination address is connected to a network port of the receiving device, or to a network port of another device of the switching fabric 10 (FIG. 1). If the destination port is a local network port 14 (FIG. 1) of the current receiving device, only a local transaction must be processed. If the destination port is a network port 14 (FIG. 1) of a device of the fabric other than the current receiving device, the data packet must be transferred from the current receiving device, or "source device", to the destination device via the data ring by processing an interconnect transaction which requires resource reservation performed using a resource reservation protocol.

The resource reservation protocol is used to set up source-destination channels for each interconnect transaction prior to beginning the transfer of data from a source device to a destination device via a source-destination channel on the data ring. The resource reservation protocol uses protocol control messages including a source request message (SR- C_REQ message), a get resource message (GET_RES message), and a destination grant message (DST_GRANT message).

To initiate an interconnect transaction, the control ring processing unit 70 of a source device develops a SRC_REQ message including a field carrying the destination port ID code associated with the destination port, determined by and received from the control unit 120. The control ring processing unit 70 transmits the SRC_REQ message to the destination device via the control ring. When a destination device receives a SRC_REQ message from a source device via the control ring, the SRC_REQ message is temporarily buffered. The control ring processing unit 70 reads the SRC_REQ messages and provides corresponding request signals to the network output port arbitration sub-system 116. Based on the source port and destination port indicated by the SRC_REQ message, the processing unit 70 provides a signal to the arbitration sub-system 116 requesting access to the destination port on behalf of the source port as the requesting agent.

For each particular one of the network ports 14 (FIG. 1), the network output port arbitration sub-system 116 may receive a maximum of 32 simultaneously activated request signals from 32 requesting agents including the seven other local network ports 14 (FIG. 1), 24 network ports 14 (FIG. 1) of the other three switching devices 12 (FIG. 1) or the current switching device 12, and the CPU 52 (FIG. 1).

The second port 118 of the arbitration sub-system is coupled to receive non-local request signals from port 82 of the control ring processing unit 70 on behalf of non-local agents competing for access to the eight network output ports 115. The second port 118 of the arbitration sub-system is also coupled to provide grant signals to port 82 of the control ring processing unit 70 for the purpose of granting access to the eight network output ports 115. Upon receiving a grant signal corresponding with a particular non-local requesting agent, the control ring processing unit 70 generates a corresponding DST_GNT message which is provided to the corresponding switching device via the control ring.

The first port 117 of the arbitration sub-system is coupled to receive local request signals from port 110 of the control unit 120 on behalf of local agents competing for access to the eight network output ports 115. The local request signals indicate that locally received data packets, that is data packets received at one of the network input ports 166 of the current switching device 12 are ready to be transmitted to the network via destination ones of the eight network output ports 115 of the current switching device. The first port 117 of the arbitration sub-system is also coupled to provide grant signals to port 110 of the control unit 120 for the purpose of granting access to the eight network output ports 115.

The control unit 120 is operative to access data packets a data burst at a time from the external packet buffer 150 in response to the queuing enable signal received at port 128 from the control ring processing unit 70. Data packets are read out a burst at a time from the external packet buffer 150 via multiple channels under control of the control unit 120. When the control ring processing unit 70 allocates sufficient external packet buffer channel bandwidth, the packet buffer begins transmitting packet data bursts from output 178 of the buffer 150 to input 144 of the internal FIFO 140 under control of the input queuing control unit 120.

Figure 3:
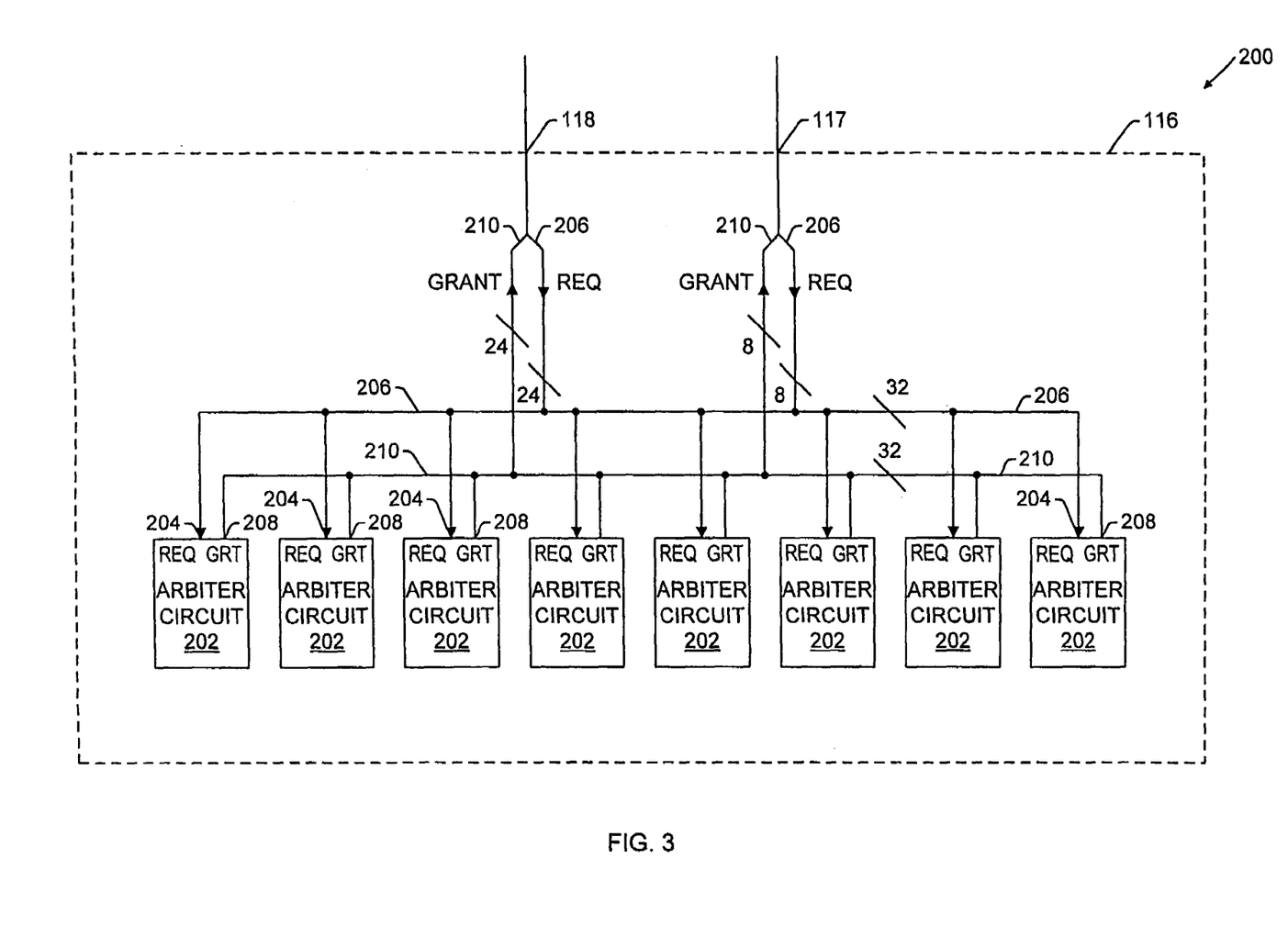
FIG. 3 is a block diagram of a network output port arbitration sub-system in accordance with the present invention for arbitrating between a plurality of source request signals each requesting access to one of a plurality of eight network output ports of the switching device of FIG. 2.

FIG. 3 shows a detailed block diagram at 200 of the network output port arbitration sub-system 116 (FIG. 2). The network output port arbitration sub-system 116 includes eight arbiter circuits 202 in accordance with the present invention, each including: a request port 204 coupled to receive 32 request signals from local and non-local requesting agents, as explained above, via ports 117 and 118 respectively and via a request bus 206; and a grant port 208 coupled to provide 32 grant signals to the local and non-local requesting agents, as explained above, via ports 117 and 118 respectively and via a grant bus 210.

Figure 4:
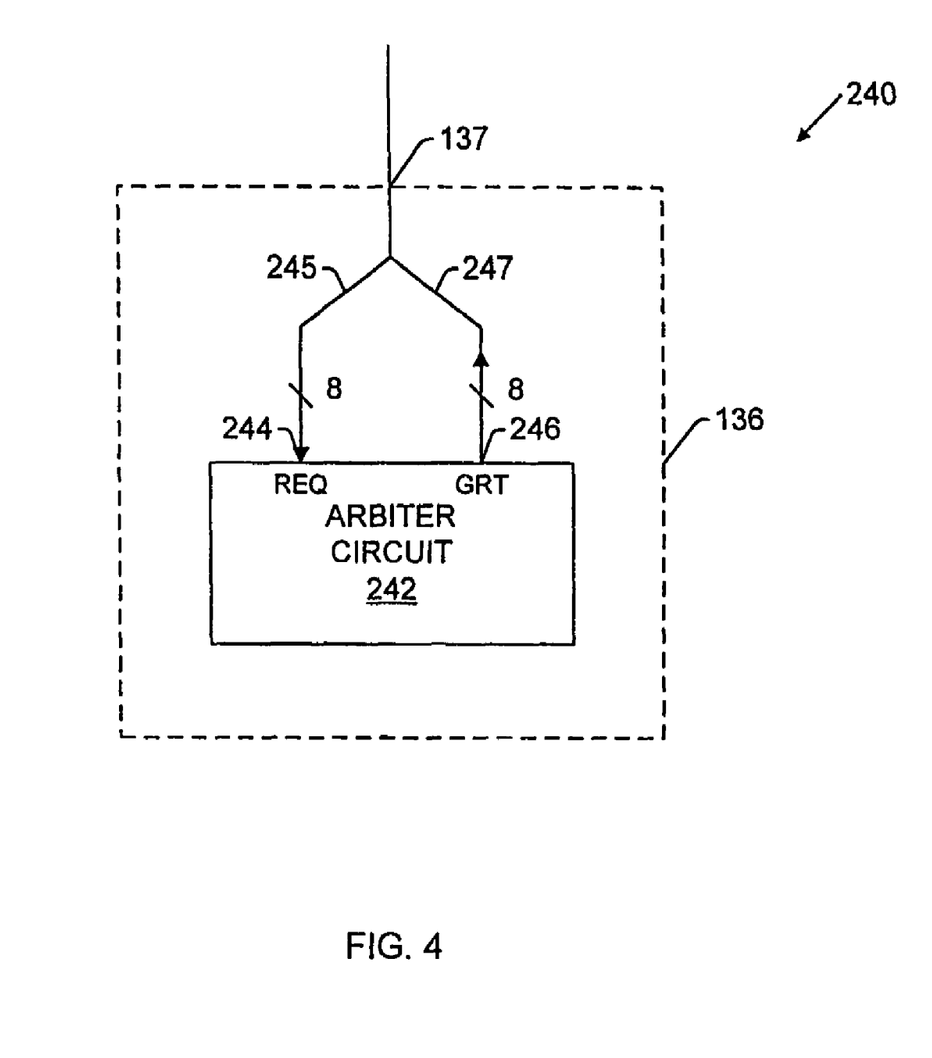
FIG. 4 is a block diagram of a packet routing table arbitration sub-system for arbitrating between a plurality of routing requests signals each requesting access to a packet routing table of the switching device of FIG. 2.

FIG. 4 shows a more detailed block diagram at 240 of the packet routing table arbitration sub-system 136 (FIG. 2) which-includes an arbiter circuit 242 having a request port 244 coupled to receive eight local data packet routing request signals, as explained above, from port 137 via a request bus 245, and a grant port 246 coupled to provide eight local data packet routing grant signals, as explained above, to port 137 via a grant bus 247.

Figure 5:
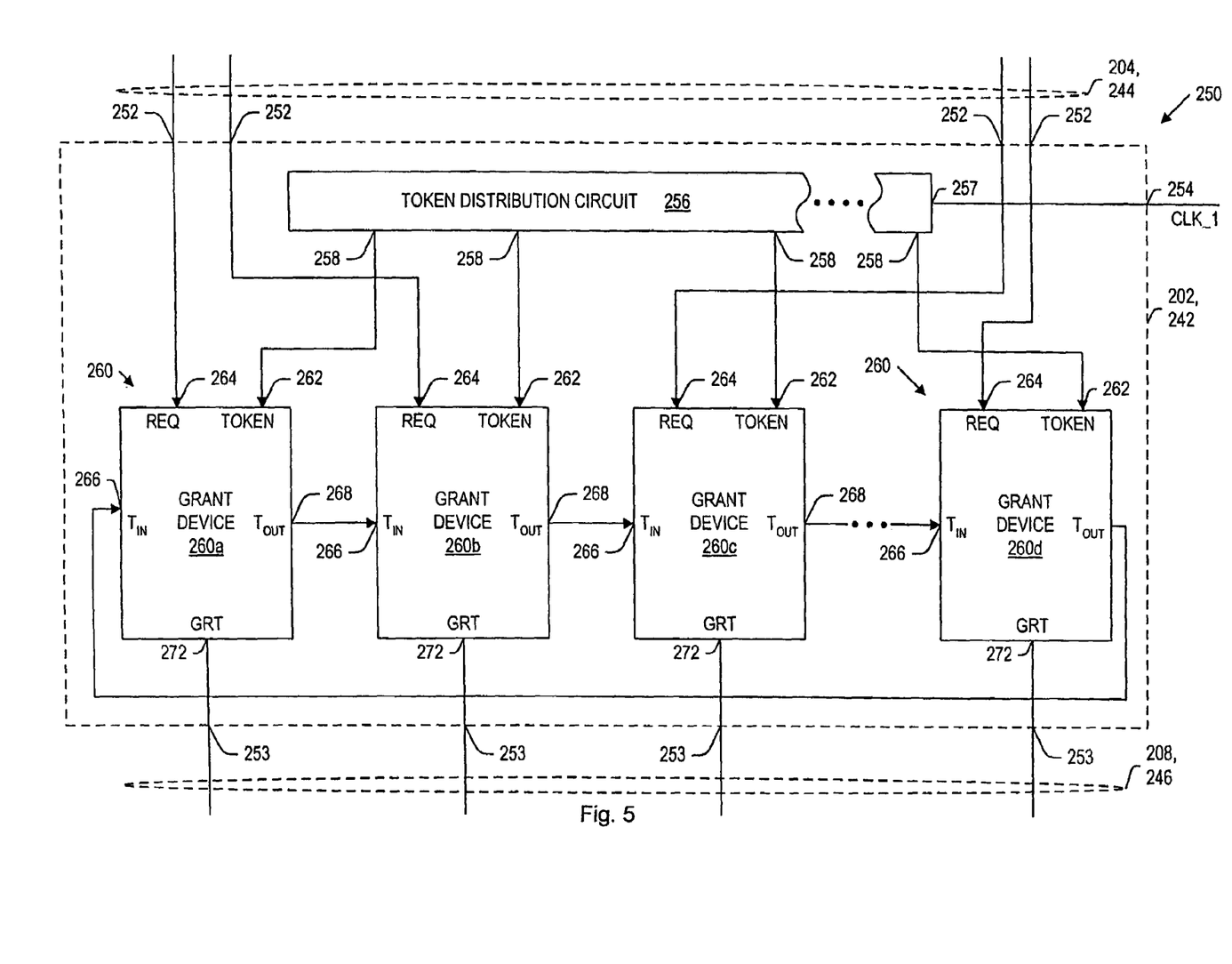
FIG. 5 is a schematic block diagram of a bit slice arbiter circuit in accordance with a first embodiment of the present invention.

FIG. 5 shows a schematic block diagram at 250 of a bit slice ripple chain arbiter circuit in accordance with one embodiment of the present invention. The arbiter circuit 250 includes a plurality of N request input terminals 252 for receiving request signals from a plurality of requesting agents, a plurality of N grant output terminals 253 providing grant signals to the plurality of requesting agents; a first clock input 254 for receiving a first clock signal CLK_1 having a period, $T_1$, defining a grant cycle as further explained below. The arbiter circuit 250 also includes: a token distribution circuit 256 having a plurality of N token priority outputs 258 each providing a corresponding token priority signal; and a plurality of N grant devices 260.

In the depicted embodiment, N=4, and so the arbiter circuit 250 includes: four request input terminals 252; four grant output terminals 253; and four grant devices 260 designated 260a, 260b, 260c, and 260d. However, in accordance with the present invention, the arbiter circuit 250 may include any integer number, N, of grant devices 260 to resolve any integer number of request signals from any number of requesting agents competing for a single resource. The arbiter circuit 250 is responsive to the N request signals and is operative to resolve the competing requests in accordance with a priority scheme further described below.

The arbiter circuit 250 may be used to implement each of the arbiter circuits 202 (FIG. 3) of the network output arbitration sub-system, and each of the arbiter circuits 242 (FIG. 4) of the packet routing table arbitration sub-system. For implementing the arbiter circuits 202 (FIG. 3), N=32 and the arbiter circuit 250 includes: 32 request input terminals 252 forming the request port 204 (FIG. 3) of the arbiter circuit 202 (FIG. 3); and 32 grant output terminals 253 forming the grant port 208 (FIG. 3). For implementing the arbiter circuits 242 (FIG. 4), N=8 and the arbiter circuit 250 includes: 8 request input terminals 252 forming the request port 244 (FIG. 4) of the arbiter circuit 242; and 8 grant output terminals 253 forming the grant port 246 of the arbiter circuit 242 (FIG. 4).

Each of the grant devices 260 includes: a token priority input 262 coupled to receive a corresponding token priority signal from a corresponding one of the N outputs 258 of circuit 256; a request input 264 coupled to receive a corresponding request signal from a corresponding requesting agent via a corresponding one of the request input terminals 252 of circuit 250, a device token carry input 266 coupled to receive a token carry signal carrying a value, $T_{IN}$, further explained below; a token pass output 268 connected to provide a corresponding token carry signal carrying a value, $T_{OUT}$, to the token carry input 266 of a next downstream one of the grant devices 260; a clock signal input 270 coupled to receive the second clock signal CLK_2 via the second clock input 255 of the arbiter circuit 250; and a grant output 272 coupled to provide a corresponding grant signal, carrying a GRT value, to a corresponding one of the N grant output terminals 253 of the arbiter circuit 250.

The token distribution circuit 256 is operative to assign priority to one of the grant devices 260 at the beginning of each grant cycle (defined by the period $T_1$ of the first clock signal CLK_1) by asserting the corresponding token priority signal provided to input 262 of the prioritized grant device, thereby initially providing the token to the prioritized grant device.

The token distribution circuit 256 may be implemented by any circuit that selects one of the grant devices 260 at the beginning of each grant cycle. In one embodiment, the token distribution circuit 256 is implemented by an N-bit shift register including N flip-flops each having an output coupled to one of the outputs 258 of the distribution circuit, and being arranged so that binary values stored in the flip-flops are shifted from one flip-flop to the next once during each period T1 of the first clock signal CLK_1, that is once during each grant cycle. Upon power up of the system, the shift register is preset so that one of the flip-flops initially stores an active value, and each of the other N−1 flip-flops initially stores an inactive value.

Implementing the token distribution circuit 256 using a simple N-bit shift register provides for a fair distribution of priority, that is "round robin priority", to each of the requesting agents. In this embodiment, at the beginning of each grant cycle, the token is initially provided to a next one of the grant devices 260. In accordance with other embodiments, the token distribution circuit 256 may be designed to implement a weighted round robin priority scheme.

Each of the grant devices 260 is operative to assert its grant signal, provided at its grant output 272, in response to: (1) the token priority signal and the request signal received at its inputs 262 and 264 being concurrently asserted; and (1) the token carry signal and the request signal received at its inputs 266 and 264 being concurrently asserted. Each of the grant devices 260 is also operative to assert the token carry signal provided at its token pass output 268 in response to the token priority signal received at its input 262 being asserted while the request signal received at its input 264 is de-asserted. Assertion of the token carry signal by a current one of the grant devices 260 effectively "passes the token" from the current grant device to the next downstream grant device which has its token carry input 266 connected to the current grant device. Therefore, a grant device which has the token but is not receiving an active request signal will pass the token by asserting its token pass output 268. Each of the grant devices 260 may obtain the token via either its token priority input 262 or its token carry input 266. At the end of a grant cycle, the grant output 272 of only one of the grant devices 260 will be asserted if one or more of the request signals are asserted.

Logic expressions for the grant signal (carrying the GRT value) and the token carry signal (carrying the value, $T_{OUT}$) provided at outputs 272 and 268 of each of the grant devices are provided in Relationships (1) and (2), below.

$$\text{GRT} = (\text{TOKEN OR } T_{IN}) \text{ AND REQ} \tag{1}$$

$$T_{OUT} = (\text{TOKEN OR } T_{IN}) \text{ AND REQ}' \tag{2}$$

wherein REQ represents the value carried by the request signal received at the corresponding request input 264 of the grant device.

In the embodiment described above wherein the token distribution circuit 256 is implemented using a simple N-bit shift register, the period of the first clock signal CLK_1 (the grant cycle T1) must be greater than the product of N and the time required for generating the grant signal and the token carry signal at outputs 272 and 268 respectively based on the values of the request signal, token priority signal, and token carry signal received at the corresponding inputs 264, 262, and 266 as described in relationships (1) and (2) above.

Advantages provided by the bit slice arbiter circuit 250 include scalability and ease of implementation. The arbiter circuit 250 may be scaled to have any integer number, N, of grant devices. However, the operational frequency of the arbiter circuit 256 is limited due to the ripple chain effect of the token passing as described above.

Figure 6:
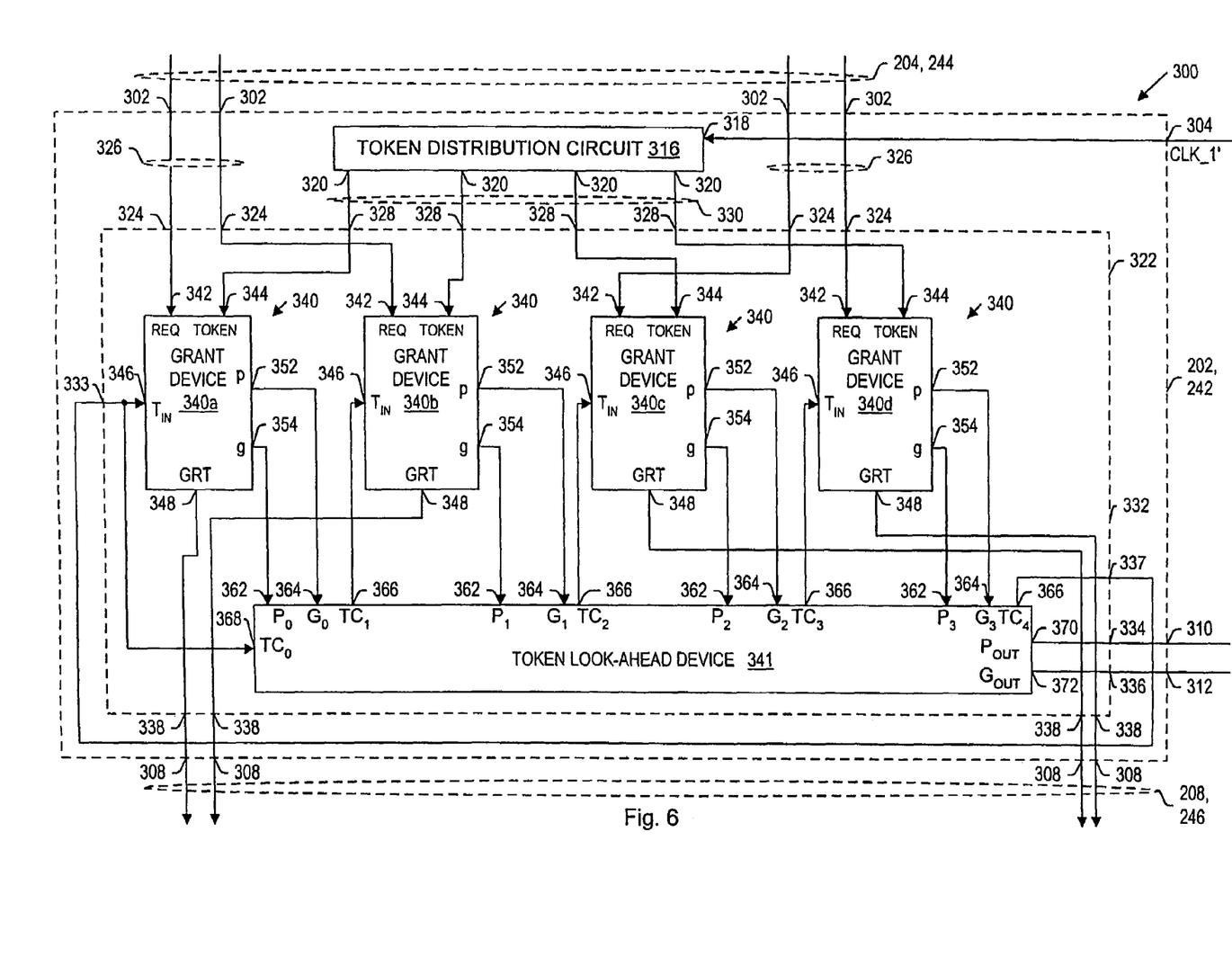
FIG. 6 is a schematic block diagram of a token look ahead arbiter circuit in accordance with a second embodiment of the present invention.

FIG. 6 shows a schematic block diagram at 300 of a token look ahead arbiter circuit in accordance with a second embodiment of the present invention. The token look ahead arbiter circuit 300 provides faster performance, and therefore a shorter grant cycle and less arbitration latency, than the bit slice arbiter circuit 250 (FIG. 5) which has limited speed due to the ripple chain effect as the token is passed from one grant device to the next. Circuit 300 speeds up the arbitration process by eliminating the ripple chain effect of token passing.

The arbiter circuit 300 includes a plurality of M request input terminals 302, a clock input 304 for receiving a clock signal CLK_1', a plurality of M grant output terminals 308, a circuit token propagate output 310, and a circuit token generate output 312.

In the depicted embodiment, M=4, and so the arbiter circuit 300 includes: four request input terminals 302; four grant output terminals 308; and four grant devices 340 designated 340a, 340b, 340c, and 340d. In accordance with the present invention, the arbiter circuit 300 may include any integer number of grant devices. However, as further explained below, the grant period of a token look ahead arbiter circuit according to the present invention increases as a function of ($\log_4 N$) wherein N is the number of request signals to be resolved.

The arbiter circuit 300 may be used to implement each of the arbiter circuits 202 (FIG. 3) of the network output arbitration sub-system, and each of the arbiter circuits 242 (FIG. 4) of the packet routing table arbitration sub-system. For implementing the arbiter circuits 202 (FIG. 3), N=32 and the arbiter circuit 300 includes: 32 request input terminals 302 forming the request port 204 (FIG. 3) of the arbiter circuit 202 (FIG. 3); and 32 grant output terminals 308 forming the grant port 208 (FIG. 3). For implementing the arbiter circuits 242 (FIG. 4), N=8 and the arbiter circuit 300 includes: 8 request input terminals 302 forming the request port 244 (FIG. 4) of the arbiter circuit 242; and 8 grant output terminals 308 forming the grant port 246 of the arbiter circuit 242 (FIG. 4).

The arbiter circuit 300 includes a token distribution circuit 316 having a clock input 318 coupled to receive the first clock signal CLK_1' via input 304 of circuit 300, and a plurality of M token priority outputs 320 each providing a corresponding token priority signal; and a token look ahead circuit 322. The circuit 322 includes: a plurality of M request input terminals 324 each coupled to receive a corresponding request signal from a requesting agent via a corresponding one of the M request input terminals 302 of circuit 300, the terminals 324 providing a request port 326 of circuit 322; a plurality of M token priority input terminals 328 each coupled to receive a corresponding token priority signal from a corresponding one of the M token outputs 320 of circuit 316, the terminals 328 providing a token receive port 330 of circuit 322; a circuit token carry input 333 for receiving a circuit token carry signal as further explained below; a circuit token propagate output 334 coupled to provide a circuit token propagate output signal to output 310 of circuit 300 as further explained below; a circuit token generate output 336 coupled to provide a circuit token generate output signal to output 312 of circuit 300 as further explained below; a circuit token pass output 337 providing the circuit token carry signal to input 333 via feedback path as further explained below; and a plurality of M grant terminals 338 each coupled to provide a corresponding grant signal to a corresponding one of the N grant output terminals 308 of circuit 300.

The circuit 322 further includes a plurality of M grant devices 340, and a token look ahead device 341. Each of the grant devices 340 includes: a request input 342 coupled to receive a corresponding one of the request signals via request port 326 of circuit 322; a token priority input 344 coupled to receive a corresponding one of the token priority signals from a corresponding one of the outputs 320 of circuit 316; a device token carry input 346 further explained below; a grant output 348 coupled to provide a corresponding grant signal to a corresponding one of the M grant output terminals 338; a device token propagate output 352 providing a device token propagate signal as further explained below; and a device token generate output 354 providing a device token generate signal as further explained below.

The token look ahead device 341 includes: a plurality of M token propagate inputs 362 each coupled to receive a corresponding one of the token generate signals from the token generate output 354 of a corresponding one of the grant devices 340; a plurality of M token generate inputs 364 each coupled to receive a corresponding one of the token propagate signals from the token generate output 354 of a corresponding one of the grant devices 340; a plurality of M token look ahead outputs 366 each coupled to provide a corresponding token look ahead signal to the token carry input 346 of a next downstream one of the grant devices 340; a token look ahead input 368 designated $TC_0$ which is coupled via the feed back path to receive the circuit token carry signal provided by one of the token look ahead outputs 366 which is associated with the last of the grant devices 340 via the circuit token pass output 337 as further explained below; a circuit token propagate output 370 designated $P_{OUT}$ and providing a circuit propagate output signal to port 334 of circuit 322; and a circuit token generate output 372 designated $G_{OUT}$ and providing the generate output signal to port 336 of circuit 322.

In the depicted embodiment, circuit 322 includes M=4 grant devices designated 340a, 340b, 340c, and 340d. Therefore, the token look ahead device 341 includes: four token propagate inputs 362 designated $P_0$, $P_1$, $P_2$, and $P_3$ for receiving the token generate signals from the token generate outputs 354 of the grant devices 340a, 340b, 340c, and 340 d respectively; four token generate inputs 364 designated $G_0$, $G_1$, $G_2$, and $G_3$ for receiving the token propagate signals from the token propagate outputs 352 of the grant devices 340a, 340b, 340c, and 340d respectively; and four token look ahead outputs 366 designated $TC_1$, $TC_2$, $TC_3$, and $TC_4$ providing token look ahead carry signals (carrying values $TC_1$, $TC_2$, $TC_3$, and $TC_4$ respectively) to the token carry inputs 346 of the grant devices 340b, 340c, 340d, and 340a respectively. The token look ahead input 368, designated $TC_0$, is connected in feedback with the token look ahead output 366 which is designated $TC_4$.

The token distribution circuit 316 is operative to assign priority to one of the grant devices 340 at the beginning of each grant cycle ($T_1'$) by asserting the corresponding token priority signal provided to the prioritized grant device. The token distribution circuit 316 may be implemented by any circuit that selects one of the grant devices 340 for each grant cycle. Similar to the token distribution circuit 256 (FIG. 5), to achieve round robin priority, the token distribution circuit 316 may be implemented by an M-bit shift register including M flip-flops configured to shift once during each period ($T_1'$) of the first clock signal CLK_1', that is once during each grant cycle.

Logical expressions for the values of the propagate signal and generate signal provided at outputs 352 and 354 of each of the grant devices 340 are given by relationships (3) and (4), below.

$$p = REQ' \tag{3}$$

$$g = TOKEN \text{ AND } (REQ') \tag{4}$$

wherein REQ represents the value carried by the request signal received at the corresponding request input 342 of the corresponding grant device, and TOKEN represents the value carried by the token priority signal received at the input 344 of the corresponding grant device.

Logical expressions for the values of the four token look ahead carry signals provided at outputs 366 of the grant devices 340a, 340b, 340c, and 340d respectively are given by Relationships (5) through (8), below.

$$TC_1 = G_0 \text{ OR } (P_0 \text{ AND } TC_0) \tag{5}$$

$$TC_2 = G_1 \text{ OR } (P_1 \text{ AND } G_0) \text{ OR } (P_1 \text{ AND } P_0 \text{ AND } TC_0) \tag{6}$$

$$TC_3 = G_2 \text{ OR } (P_2 \text{ AND } G_1) \text{ OR } (P_2 \text{ AND } P_1 \text{ AND } G_0)$$
$$\text{OR } (P_2 \text{ AND } P_1 \text{ AND } P_0 \text{ AND } TC_0) \tag{7}$$

$$TC_4 = G_3 \text{ OR } (P_3 \text{ AND } G_2) \text{ OR } (P_3 \text{ AND } P_2 \text{ AND } G_1)$$
$$\text{OR } (P_3 \text{ AND } P_2 \text{ AND } P_1 \text{ AND } G_0) \text{ OR } (P_3 \text{ AND }$$
$$P_2 \text{ AND } P_1 \text{ AND } P_0 \text{ AND } TC_0) \tag{8}$$

Logical expressions for the values, $P_{OUT}$ and $G_{OUT}$, of the propagate signal and generate signal provided at outputs 370 and 372 of the token look ahead device 341 are given by Relationships (9) and (10), below.

$$P_{OUT} = P_3 \text{ AND } P_2 \text{ AND } P_1 \text{ AND } P_0 \tag{9}$$

$$G_{OUT} = G_3 \text{ OR } (P_3 \text{ AND } G_2) \text{ OR } (P_3 \text{ AND } P_2 \text{ AND }$$
$$G_1) \text{ OR } (P_3 \text{ AND } P_2 \text{ AND } P_1 \text{ AND } G_0) \tag{10}$$

Longer arbitration chains can be generated by adding additional look-ahead circuits.

Table 1, below, shows a truth table for the functioning of each of the grant devices 340.

TABLE 1

| $T_{IN}$ | REQ | TOKEN | GRANT | $T_{OUT}$ |
|---|---|---|---|---|
| 0 | 0 | 0 | 0 | 0 |
| 0 | 0 | 1 | 0 | 1 |
| 0 | 1 | 0 | 0 | 0 |
| 0 | 1 | 1 | 1 | 0 |
| 1 | 0 | 0 | 0 | 1 |
| 1 | 0 | 1 | 0 | 1 |
| 1 | 1 | 0 | 1 | 0 |
| 1 | 1 | 1 | 1 | 0 |

The token look ahead device 341 may be implemented in accordance with methods and apparatus for implementing a look ahead carry scheme for reducing the carry propagation delay of a parallel adder as described by Franklin P. Prosser and David E. Winkle in "The Art of Digital Design", Second Edition, PTR Prentice-Hall, Inc., 1987, pp. 92-99.

The grant cycle $T_1'$ (the period of the clock signal CLK_1') of the token look ahead arbiter circuit 300 must be long enough to allow the token look ahead circuit 322 to be resolved. Assume that $T_2$ is the time required for generating one of the grant signals provided at output 348 of each of the grant devices 340, that is the time required to resolve the circuit described by relationship (1), above. Also assume that $T_3$ is the time required for generating one of the device token generate signals provided at output 354 of each of the grant devices 340 (FIG. 6), that is the time required to resolve the circuit described by relationship (4), above. Further assume that $T_4$ is the time required to generate the token look ahead carry signal $TC_4$ at the fourth one of the token look ahead outputs 366 of the token look ahead device 341, that is the time required to resolve the circuit described by relationship (8), above. The grant cycle, $T_1'$, must satisfy relationship (11), below.

$$T_1' \geq (T_2 + \lceil \log_4 N \rceil * T_4 + T_3) \times 2 \qquad (11)$$

where $\lceil \log_4 N \rceil$ is a ceiling function which provides the next highest integer greater than $(\log_4 N)$ if $(\log_4 N)$ is not an integer. The multiple of two (×2) is needed due to the feed back nature of the circuit 322.

Figure 7:
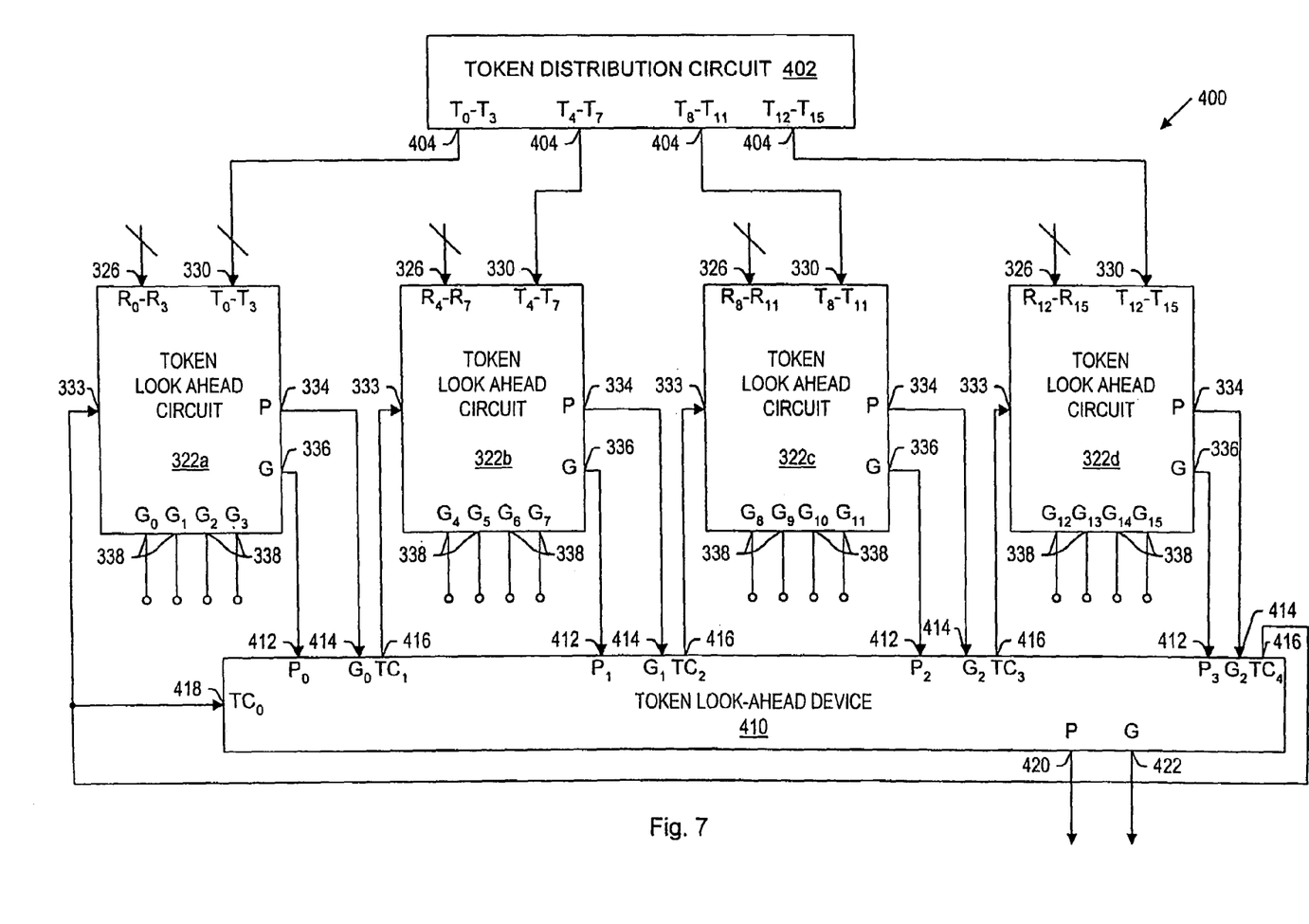
FIG. 7 is a schematic block diagram of a sixteen-bit arbiter circuit implemented using the token look ahead arbiter circuit of FIG. 6.

FIG. 7 shows a schematic block diagram at 400 of a sixteen-device arbiter circuit implemented using the token look ahead circuit 322 of FIG. 6. The arbiter circuit 400 includes: four of the token look ahead circuits 322 designated 322a, 322b, 322c, and 322d; a token distribution circuit 402 having four token priority output ports 404 each providing four token priority signals to the token priority port 330 of a corresponding one of the token look ahead circuits 322; and a token look ahead device 410. Similar to the token distribution circuits 256 and 316 (FIGS. 4 and 5), the token distribution circuit 402 may be implemented by any circuit that selects one of the grant devices 340 (FIG. 6) of one of the look ahead circuits 322 for each grant cycle. In order to achieve round robin priority, the token distribution circuit 402 may be implemented by an 16-bit shift register including 16 flip-flops configured to shift once during each grant cycle of the arbiter circuit 400.

The token look ahead device 410 includes: four token propagate inputs 412 designated $P_0$, $P_1$, $P_2$, and $P_3$ for receiving the circuit token propagate signals from the circuit token generate outputs 336 of the token look ahead circuits 322a, 322b, 322c, and 322d respectively; four token generate inputs 424 designated $G_0$, $G_1$, $G_2$, and $G_3$ for receiving the circuit token generate signals from the circuit token propagate outputs 334 of the circuits 322a, 322b, 322c, and 322d respectively; and four token look ahead outputs 416 designated $TC_1$, $TC_2$, $TC_3$, and $TC_4$ for providing circuit token look ahead carry signals to the circuit token carry inputs 333 of the circuits 322b, 322c, 322d, and 322a respectively; a circuit token look ahead input 418 designated $TC_0$ which is coupled via a feed back path to receive the token look ahead signal provided by the token look ahead output 416 associated with a last of the circuits 322; a circuit token propagate output 420 designated $P_{OUT}$ and providing a circuit propagate output signal; and a circuit token generate output 422 designated G. The circuit token look ahead input 418 designated $TC_0$ is coupled to receive the circuit token look ahead carry signal from the token look ahead output 416 designated $TC_4$. In one embodiment, the token look ahead device 410 provides the same logical operation as described above for the token look ahead device 341 (FIG. 6).

Because the sixteen-bit arbiter circuit 400 is implemented using four of the token look ahead circuit 322 (FIG. 6), the grant cycle of the circuit 400 must satisfy relationship (11). above which also describes to the grant cycle of token look ahead circuit 322. The arbiter circuit 400, which is used to resolve the 16 request signals $R_0$-$R_{15}$, includes two layers of the token look ahead device 341 (FIG. 6). The first layer includes the four token look ahead devices 341 (FIG. 6) of the circuits 322a, 322b, 322c, and 322d. The second layer includes the token look ahead device 410 which, in the preferred embodiment, is implemented by the token look ahead device 341 (FIG. 6).

As the number, N, of request signals to be resolved increases, relationship (11) may be simplified to $2 \times \lceil \log_4 N \rceil$. The significance of this is that the grant cycle does not change if the number of request signals is within a boundary defined by $4^M$, where M is any integer. Therefore, for 1 to 4 request signals (M=1), the grant cycle is approximately the same. For 5 to 16 request signals (M=2), the grant cycle is approximately the same. For 16-64 request signals, (M=3), the grant cycle is approximately the same and so on. The reason for this is that $\lceil \log_4 N \rceil$ corresponds to the number of layers of token look ahead devices needed. For resolving 1-4 request signals, the circuit 300 (FIG. 6) requires only one layer of token look ahead devices 341 (FIG. 6). For resolving 5-16 request signals, the arbiter circuit 400 requires two 2 layers of token look ahead devices 341 (FIG. 6). In accordance with the present invention, a 64-bit token look ahead circuit (not shown) for resolving 64 request signals includes four of the circuits 300 (FIG. 6) each coupled to a token look ahead device similar to device 341 (FIG. 6). A 64-bit token look ahead circuit has three layers of look ahead devices, and has a total of 21 look ahead devices.

Figure 8:
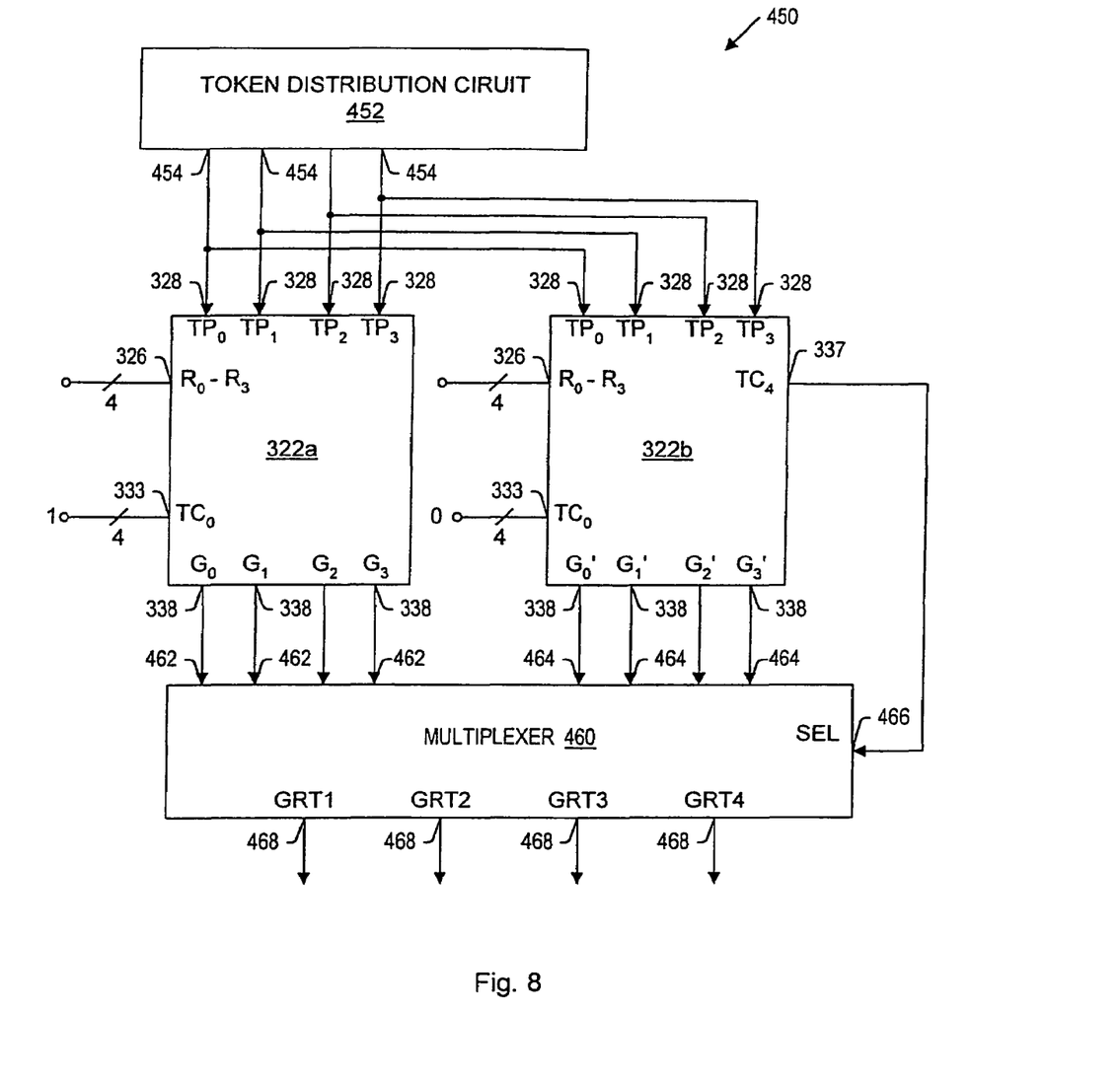
FIG. 8 is a schematic block diagram of a non-feedback bit slice arbiter circuit in accordance with the present invention.

FIG. 8 shows a schematic block diagram at 450 of a non-feedback bit slice arbiter circuit in accordance with the present invention, the circuit 450 being implemented using the token look ahead circuit 322 of FIG. 6. The arbiter circuit 450 includes a token distribution circuit 452 having four token priority outputs 454 each providing a corresponding token priority signal; and two of the token look ahead circuits 322 (FIG. 6) designated 322a and 322b. In order to achieve round robin priority, the token distribution circuit 452 may be implemented as a shift register including four flip-flops.

Each of the request input ports 326 of the first and second token look ahead circuits 322a and 322b is coupled to receive four request signals designated $R_0$-$R_3$ from four requesting agents. The four token priority inputs 328 of each of the first and second token look ahead circuits 322a, 322b are respectively coupled to receive token priority signals designated $TP_0$-$TP_3$ from the token priority outputs 454 of the distribution circuit 452. The circuit token carry input 333 of the first token look ahead circuit 322a is connected to receive a signal having a constant active signal level (logical one, or HIGH). The circuit token carry input 333 of the second token look ahead circuit 322b is connected to receive a signal having a constant deactivated signal level (logical zero, or LO).

The arbiter circuit 450 also includes a multiplexer 460 having: a first set of four grant inputs 462 coupled to receive a first set of four grant signals designated $G_0$-$G_3$ from the grant terminals 338 of the first token look ahead circuit 322a; a second set of four grant inputs 464 coupled to receive a second set of four grant signals designated $G_0'$-$G_3'$ from the grant terminals 338 of the second token look ahead circuit 322b; a multiplexer select input 466 coupled to receive the circuit token carry signal $TC_4$ provided by the circuit token pass output 337 of the second token look ahead circuit 322b; and four grant outputs 468. Under control of the signal received at the select input 466, the grant outputs 468 of the multiplexer 460 selectably provide the first set of grant signals $G_0$-$G_3$, and the second set of grant signals $G_0'$-$G_3'$. If the circuit token carry signal $TC_4$ provided by the circuit token pass output 337 is activated, the four grant outputs 468 provide the first set of grant signals $G_0$-$G_3$ respectively. If the circuit token carry signal $TC_4$ provided by the circuit token pass output 337 is deactivated, the four grant outputs 468 provide the second set of grant signals $G_0'$-$G_3'$ respectively.

In operation, the non-feedback bit slice arbiter circuit 450 basically solves two circuits at once. As mentioned, the input 333 of the first token look ahead circuit 322a is connected to an active signal level, while the input 333 of the second token look ahead circuit 322b is connected to a deactivated signal level. If the token look ahead carry signal $TC_4$ generated at output 337 of circuit 322b provides an active value (logical 1, or HIGH), then the first circuit 322a has the right answer, because TC0 should be an active value (logical 1, or HIGH) for feedback, and therefore the first set of four grant signals designated $G_0$-$G_3$ provided at the grant terminals 338 of the first token look ahead circuit 322a are selected. Alternatively, the token look ahead carry signal $TC_4$ generated at output 337 of circuit 322b provides an inactive value (logical 0, or LO), then the second circuit 322b has the right answer, because TC0 should be an inactive value (logical 0, or LO) for feedback, and therefore the second set of four grant signals designated $G_0'$-$G_3'$ provided at the grant terminals 338 of second first token look ahead circuit 322b are selected.

Note that the non-feedback bit slice arbiter circuit 450 may be adapted to include a different size multiplexer 460 to multiplex any number of token look ahead circuits 322. The non-feedback bit slice arbiter circuit 450 provides an advantage in the design of an arbiter circuit because certain types of circuit modeling programs (e.g., Synopsys) do not provide accurate timing analysis for circuits having feedback properties.

The grant cycle for the non-feedback bit slice arbiter circuit 450 is given by relationship (12), below.

$$T1 \geq (T2 + \lceil \log_4 N \rceil + T3) + T_{mux} \quad (12)$$

where $T_{mux}$ is the time needed to resolve the multiplexer circuit 460. Therefore, the non-feedback bit slice arbiter circuit 450 is actually twice as fast as the arbiter circuit 400 (FIG. 7) which uses feed-back. However, the non-feedback bit slice arbiter circuit 450 requires more circuitry.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An arbiter circuit for resolving a plurality of N request signals received from a plurality of agents requesting access to a resource, said arbiter circuit comprising:
   a token distribution circuit responsive to a first clock signal defining a grant cycle, and providing a plurality of token priority signals, said distribution circuit being operative to assert a prioritized one of said token priority signals upon completion of said grant cycle;
   a device configured to mediate signals on a token ring and
   a plurality of N grant devices coupled together by said token ring, at least one of said grant devices being responsive to a corresponding one of said request signals, to a corresponding one of said token priority signals, and to a corresponding token carry signal.

2. The arbiter circuit as recited in claim 1 wherein a particular token carry signal received by a particular one of said devices is provided by an adjacent one of said devices via said mediation device, and wherein said particular token carry signal is asserted by said adjacent device if a request signal received by said adjacent device is not asserted and either a token priority signal received by said adjacent device or a token carry signal received by said adjacent device is asserted.

3. The arbiter circuit as recited in claim 1 wherein said token distribution circuit comprises an N-bit shift register having a plurality of N flip-flops, at least one N flip-flop having an output providing one of said token priority signals, and wherein one of said flip-flops is preset to an active value, and the remainder of said flip-flops is preset to an inactive value.

4. The arbiter circuit as recited in claim 1 wherein:
   at least one of said grant devices is operative to generate a corresponding token propagate signal in response to a corresponding request signal, and also operative to generate a corresponding token generate signal in response to a corresponding token priority signal and a corresponding request signal; and
   said mediation device includes a token look ahead device operative to generate said token carry signals in response to said token propagate signals and said token generate signals, said token look ahead device for increasing the operational frequency of said arbiter circuit.

5. The arbiter circuit as recited in claim 4 wherein:
   at least one of said grant devices is also operative to assert a corresponding token propagate signal provided that a corresponding request signal is de-asserted; and
   at least one of said grant devices is further operative to assert a corresponding token generate signal if a corresponding token priority signal is asserted while a corresponding request signal is de-asserted.

6. The arbiter circuit as recited in claim 5 wherein N=4, wherein said token look ahead device is operative to provide four token carry signals, and wherein:
   a first one of said token carry signals is provided to a second one of said four grant devices in response to a token propagate signal provided by a first one of said four grant devices, a token generate signal provided by said first grant device, and a fourth one of said token carry signals;
   a second one of said token carry signals is provided to a third one of said four grant devices in response to token generate signals provided by said first and second grant devices, token propagate signals provided by said first and second grant devices, and said fourth token carry signal;
   a third one of said token carry signals is provided to a fourth one of said four grant devices in response to token generate signals provided by said first, second, and third grant devices, token propagate signals provided by said first, second, and third grant devices, and said fourth token carry signal; and
   said fourth one of said token carry signals is provided to said first grant device in response to said token generate signals provided by at least one of said grant devices, said token propagate signals, and said fourth token carry signal.

7. The arbiter circuit as recited in claim 4 wherein said token look ahead device includes a circuit token carry input coupled to receive one of said token carry signals via a feed back path.

8. An arbiter circuit for use in a network switch for resolving a plurality of N request signals received from a plurality of agents requesting access to a resource, said arbiter circuit comprising:
   a token distribution circuit responsive to a first clock signal defining a grant cycle, and providing a plurality of token priority signals, said distribution circuit being operative to assert a prioritized one of said token priority signals upon completion of at least one said grant cycle;
   a mediation device configured to mediate signals on a token ring; and a plurality of N grant devices coupled together by said token ring, at least one of said grant devices being responsive to a corresponding one of said request signals, to a corresponding one of said token priority signals, and to a corresponding token carry signal.

9. The arbiter circuit for use in a network switch as recited in claim 8 wherein said resource includes a packet routing table.

10. The arbiter circuit for use in a network switch as recited in claim 8 wherein said resource is a network output port.

11. The arbiter circuit for use in a network switch as recited in claim 8 wherein a particular token carry signal received by a particular one of said devices is provided by an adjacent one of said devices via said mediation device, and wherein said particular token carry signal is asserted by said adjacent device if a request signal received by said adjacent device is not asserted and either a token priority signal received by said adjacent device or a token carry signal received by said adjacent device is asserted.

12. The arbiter circuit for use in a network switch as recited in claim 8 wherein said token distribution circuit comprises an N-bit shift register having a plurality of N flip-flops, at least one N flip-flop having an output providing one of said token priority signals, and wherein one of said flip-flops is preset to an active value, and the remainder of said flip-flops is preset to an inactive value.

13. The arbiter circuit for use in a network switch as recited in claim 8 wherein:
at least one of said grant devices is operative to generate a corresponding token propagate signal in response to a corresponding request signal, and also operative to generate a corresponding token generate signal in response to a corresponding token priority signal and said corresponding request signal; and
said mediation device includes a token look ahead device operative to generate said token carry signals in response to said token propagate signals and said token generate signals, said token look ahead device for increasing the operational frequency of said arbiter circuit.

14. The arbiter circuit for use in a network switch as recited in claim 13 wherein:
at least one of said grant devices is also operative to assert a corresponding token propagate signal provided that a corresponding request signal is de-asserted; and
at least one of said grant devices is further operative to assert a corresponding token generate signal if a corresponding token priority signal is asserted while a request signal is de-asserted.

15. The arbiter circuit for use in a network switch as recited in claim 13 wherein said token look ahead device includes a circuit token carry input coupled to receive one of said token carry signals via a feed back path.

16. An arbiter circuit for resolving a plurality of N request signals received from a plurality of agents requesting access to a resource, said arbiter circuit comprising:
a token distribution circuit responsive to a first clock signal defining a grant cycle, and providing a plurality of token priority signals, said distribution circuit being operative to assert a prioritized one of said token priority signals upon completion of said grant cycle; and
a plurality of N grant devices, at least one thereof being responsive to a corresponding one of said request signals, to a corresponding one of said token priority signals, and to a corresponding token carry signal provided by an adjacent one of said grant devices.

17. An arbiter circuit for resolving a plurality of N request signals received from a plurality of agents requesting access to a resource, said arbiter circuit comprising:
token distribution means for responding to a first clock signal defining a grant cycle and for providing a plurality of token priority signals, said token distribution means being operative to assert a prioritized one of said token priority signals upon completion of said grant cycle;
mediation means for mediating signals on a token ring; and
a plurality of N granting means for providing grant signals, wherein
said granting means are coupled together by said token ring, at least one of said granting means being responsive to a corresponding one of said request signals, to a corresponding one of said token priority signals, and to a corresponding token carry signal.

18. An arbiter circuit for use in a network switch for resolving a plurality of N request signals received from a plurality of agents requesting access to a resource, said arbiter circuit comprising:
a token distribution means, responsive to a first clock signal defining a grant cycle, for providing a plurality of token priority signals, said distribution means being operative to assert a prioritized one of said token priority signals upon completion of at least one said grant cycle;
means for mediating signals on a token ring; and
a plurality of N granting means for providing grant signals, wherein said granting means are coupled together by said token ring, at least one of said granting means being responsive to a corresponding one of said request signals, to a corresponding one of said token priority signals, and to a corresponding token carry signal.

19. An arbiter circuit for resolving a plurality of N request signals received from a plurality of agents requesting access to a resource, said arbiter circuit comprising:
a token distribution means, responsive to a first clock signal defining a grant cycle, for providing a plurality of token priority signals, said distribution means being operative to assert a prioritized one of said token priority signals upon completion of said grant cycle; and
a plurality of N granting means for providing grant signals, at least one thereof being responsive to a corresponding one of said request signals, to a corresponding one of said token priority signals, and to a corresponding token carry signal provided by an adjacent one of said grant devices.

* * * * *